United States Patent
Tozaki

(10) Patent No.: US 8,231,118 B2
(45) Date of Patent: Jul. 31, 2012

(54) RECEIVING JIG DEVICE, AND WORKING MACHINE USING THE DEVICE

(75) Inventor: Takanobu Tozaki, Toyokawa (JP)

(73) Assignee: Sintokogio, Ltd., Aichi (JP)

( * ) Notice: Subject to any disclaimer, the term of this patent is extended or adjusted under 35 U.S.C. 154(b) by 264 days.

(21) Appl. No.: 12/670,090

(22) PCT Filed: Jul. 14, 2008

(86) PCT No.: PCT/JP2008/062694
§ 371 (c)(1),
(2), (4) Date: Jan. 21, 2010

(87) PCT Pub. No.: WO2009/014024
PCT Pub. Date: Jan. 29, 2009

(65) Prior Publication Data
US 2010/0187738 A1    Jul. 29, 2010

(30) Foreign Application Priority Data
Jul. 25, 2007 (JP) ................................. 2007-193507

(51) Int. Cl.
*B23Q 1/64* (2006.01)
(52) U.S. Cl. ............................... 269/71; 269/55; 269/75
(58) Field of Classification Search ................... 269/71, 269/55, 60, 75, 291, 309–301, 73, 81
See application file for complete search history.

(56) References Cited

U.S. PATENT DOCUMENTS

| | | | | |
|---|---|---|---|---|
| 5,725,205 A * | 3/1998 | O'Berg | ............................ | 269/37 |
| 6,637,737 B1 * | 10/2003 | Beecherl et al. | ................ | 269/71 |
| 6,955,345 B2 * | 10/2005 | Kato | ............................... | 269/61 |
| 7,635,119 B1 * | 12/2009 | Patel | ............................... | 269/73 |
| 7,959,141 B2 * | 6/2011 | Makino | ............................ | 269/58 |
| 2010/0187738 A1 * | 7/2010 | Tozaki | ............................ | 269/71 |

FOREIGN PATENT DOCUMENTS

| JP | 48-073882 | 10/1973 |
|---|---|---|
| JP | 2000-202913 | 7/2000 |
| JP | 2009-66433 | 4/2009 |

* cited by examiner

*Primary Examiner* — Lee D Wilson
(74) *Attorney, Agent, or Firm* — Finnegan, Henderson, Farabow, Garrett & Dunner, L.L.P.

(57) ABSTRACT

A receiving jig device and a working machine using the device. The receiving jig device includes a base table, a bearing member, a rotating axis supported by the bearing member, a rotating device for rotating the rotating axis, a first receiving jig having a supporting arm fixed to the rotating axis, a second receiving jig having a supporting arm connected rotatably to the rotating axis, and an engaging device for causing the supporting arm of the first receiving jig and the supporting arm of the second receiving jig to be brought into a connected or a disconnected state. It further provides a control device that controls the driving of the rotating device and the engaging device in a coordinated movement and holds the first receiving jig and the second receiving jig alternately in a vertical position with respect to a working device of the working machine that is adjacent to the base table on a working side, where a predetermined working is performed on an object and holds the first receiving jig and the second receiving jig alternately in an inclined position on a preparation side where an object to be worked is set for working.

2 Claims, 4 Drawing Sheets

RECEIVING JIG DEVICE, AND WORKING MACHINE USING THE DEVICE

FIELD OF THE INVENTION

This invention is directed to a receiving jig device and a working machine using the device. More particularly, it is directed to a receiving jig device and a working machine using the device, as, for example, for welding the interior parts of an automobile, or tightening a screw or connection by crimping.

BACKGROUND OF THE INVENTION

An interior part of an automobile, for example, a door trim, is manufactured by a surface skin being welded to the surface of a base made of resin material. The welder used for this welding is one that uses a jig that is exclusively used for the welding of the object to be processed and is designed to match the shape of the object (for example, see Patent Document 1).

Also, available is a welder, such as a horizontal sliding welder that performs in turn the setting and the welding of the object to be processed by the use of two jigs provided on a sliding mechanism and a rotary welder that performs in turn the setting and the welding of the object to be processed by the use of two jigs provided on a turntable mechanism.

Patent Document: Publication of the Laid-open Application, Publication No. 2000-202913

DISCLOSURE OF THE INVENTION

Problems To Be Solved

However, for the welder that uses the exclusive jig there is a problem in that the kind of object that is to be processed cannot easily be changed.

Also, for the horizontal sliding welder, the mechanism that exchanges the jigs is too complex and for that reason the cost of the equipment becomes high. For the rotary welder, because the two receiving jigs rotate, a large space is required to install the equipment. There is also a problem with the horizontal sliding welder and the rotary welder, in that teaching a welding point is difficult. This is because teaching a welding point must be carried out when the jig is held horizontally, wherein at the position that is farther apart from the operator the welding point cannot be seen from the vertical direction. Moreover, these conventional welders are designed exclusively for the particular object to be processed. So, they cannot be used for general purpose welding. Thus, there is also a problem in that the cost of the equipment will increase.

In view of the above problems, the present invention provides a receiving jig device and a working machine using the device that can reduce the cost of the equipment itself and that can also minimize the space to install it. The receiving jig device and the working machine using the device enable the teaching of a working point, for example, the teaching of a welding point, to be made easier.

The Problem To Be Solved

The receiving jig device of the present invention is one that moves a receiving jig that is loaded with an object to be processed toward a working means that performs a predetermined working, the receiving jig device comprising:

a base table that has a pair of supports that stand upright on it and that face each other;

bearing members that are disposed on the pair of supports respectively;

a rotating axis supported by the bearing members;

a rotating means that rotates the rotating axis;

a first receiving jig that has supporting arms fixed to the rotating axis;

a second receiving jig that has supporting arms rotatably connected to the rotating axis;

an engaging means that causes the supporting arms of the first receiving jig and the supporting arms of the second receiving jig be in a connected or disconnected state; and a control means that controls the positions of the first receiving jig and the second receiving jig wherein the control means holds in turn the first receiving jig and the second receiving jig in an upright position against the working means that is disposed close to the base table, by driving the rotating means and the engaging means in a coordinated movement, and also wherein it holds in turn the first receiving jig and the second receiving jig in an inclined position on the side where the object to be processed is set for working (the preparation side).

The working machine of the present invention comprises:

the receiving jig device;

a frame body provided at the edge of the base table of the receiving jig device; and X-axis, Y-axis, and Z-axis driving mechanisms installed on the frame body, which mechanisms move the working means in the X-axis, Y-axis, and Z-axis directions respectively.

THE EFFECTS OF THE INVENTION

Figure 1:
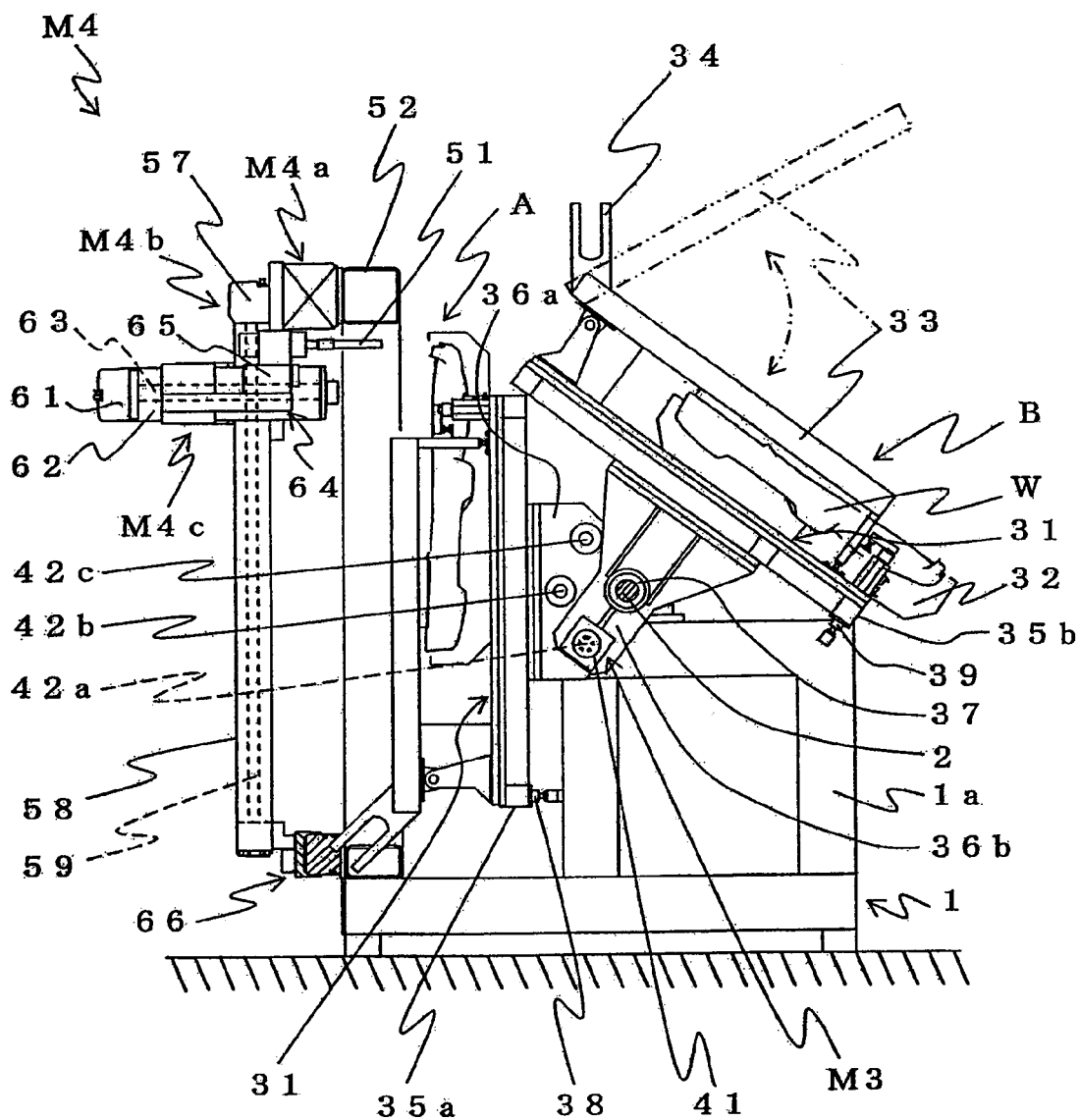
FIG. 1 shows a front view of the working machine in one embodiment of the present invention, a part of which is not shown.

The receiving jig device of the present invention can hold in turn the first receiving jig and the second receiving jig in an upright position or can hold in turn the first receiving jig and the second receiving jig in an inclined position around the rotating axis by driving the rotating means and the engaging means in a coordinated movement. By this movement the receiving jig device can prepare and set a new object to be processed (setting and resetting material) on the second receiving jig B after taking out the object that has had the working completed from the second receiving jig B, which is held in an inclined position, while the receiving jig device carries out the necessary working (welding or caulking) on the object to be processed, which is loaded on the first receiving jig, which is held in the upright position. Then after completing the working, by way of disconnecting (releasing) the supporting arms of the first receiving jig and those of the second receiving jig, rotating the first receiving jig, connecting the supporting arms of the first receiving jig and those of the second receiving jig, rotating the first receiving jig and the second receiving jig, and disconnecting (releasing) the supporting arm(s) of the first receiving jig and the second receiving jig in coordination with the rotating of the first receiving jig, the receiving jig device can move the second receiving jig to the side where the object is to be processed (working side) and the first receiving jig to the preparation side.

Thus, the receiving jig device of the present invention has the structure where the first receiving jig and the second receiving jig can rotate around one rotating axis, whereby the positional relationship of the receiving jig on the working side to the receiving jig on the preparation side, where the object to be processed is set for working, is simplified. Thus the receiving jig device of the present invention can reduce the cost of equipment and minimize the space for installing equipment.

Also, by being able to hold the receiving jig in the upright position in the processing operation, the receiving jig device of the present invention enables the operator to have a better view of all the working points and thus to make teaching of working points easier.

BEST EMBODIMENT FOR CARRYING OUT THE INVENTION

The present invention provides a receiving jig device that moves a receiving jig that is loaded with an object to be processed toward the working means that performs a predetermined working, wherein the receiving jig device can hold the first receiving jig and the second receiving jig each in an upright position or each in an inclined position around the rotating axis by one rotating means and one engaging means. It also provides a working machine using the device.

The working means comprises an ultrasonic welding means, or a vibration welding means, or a heat-welding means, or a means of fastening by a screw. Thus the working machine can be a welder or a crimping means, depending on the means of working. If the working means is a welding means, teaching of the working points means a process to identify the position in the protruded portion of each part, which positions are to be joined together by welding means.

Figure 2:
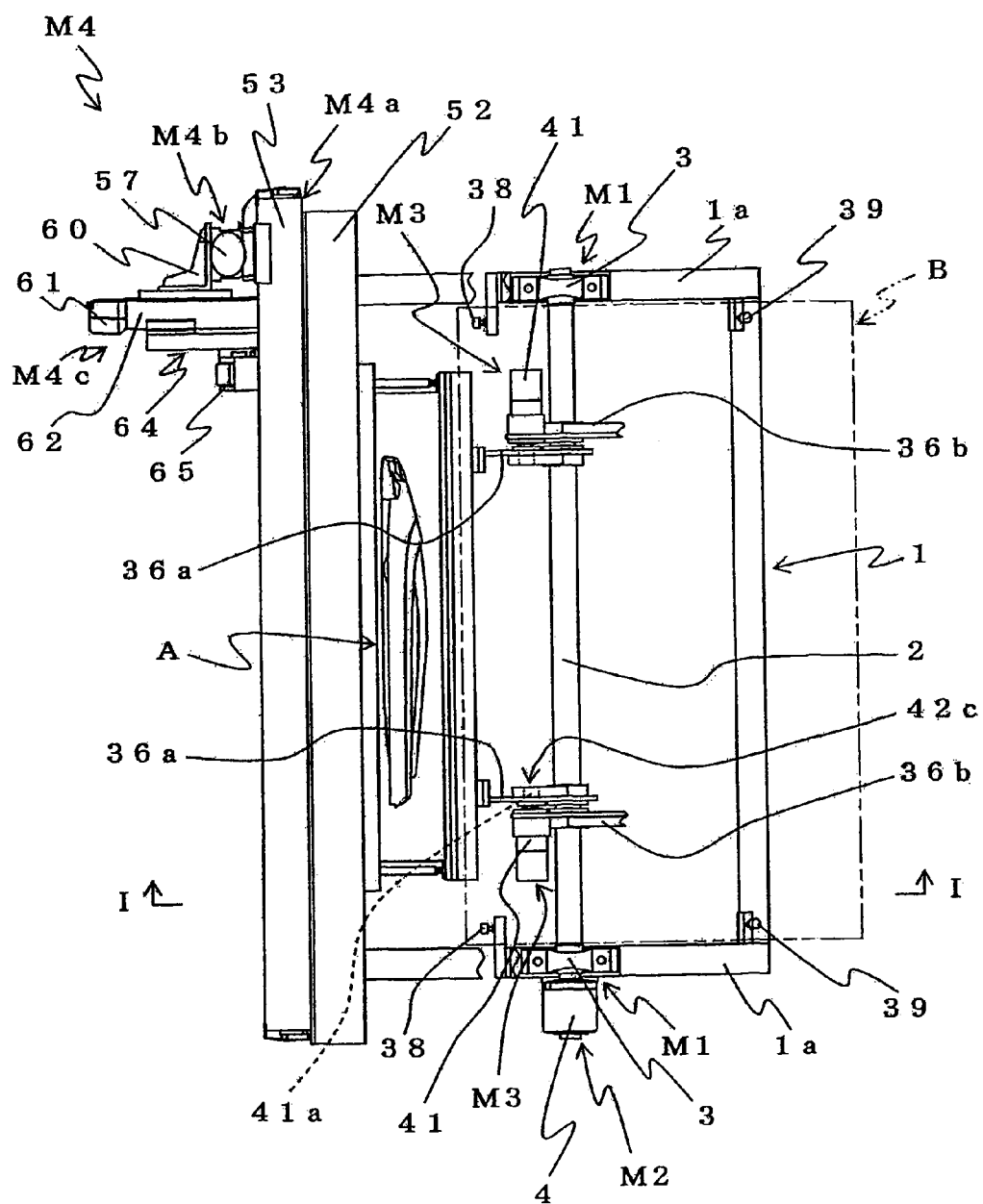
FIG. 2 is a plan view of the working machine of FIG. 1.
Figure 3:
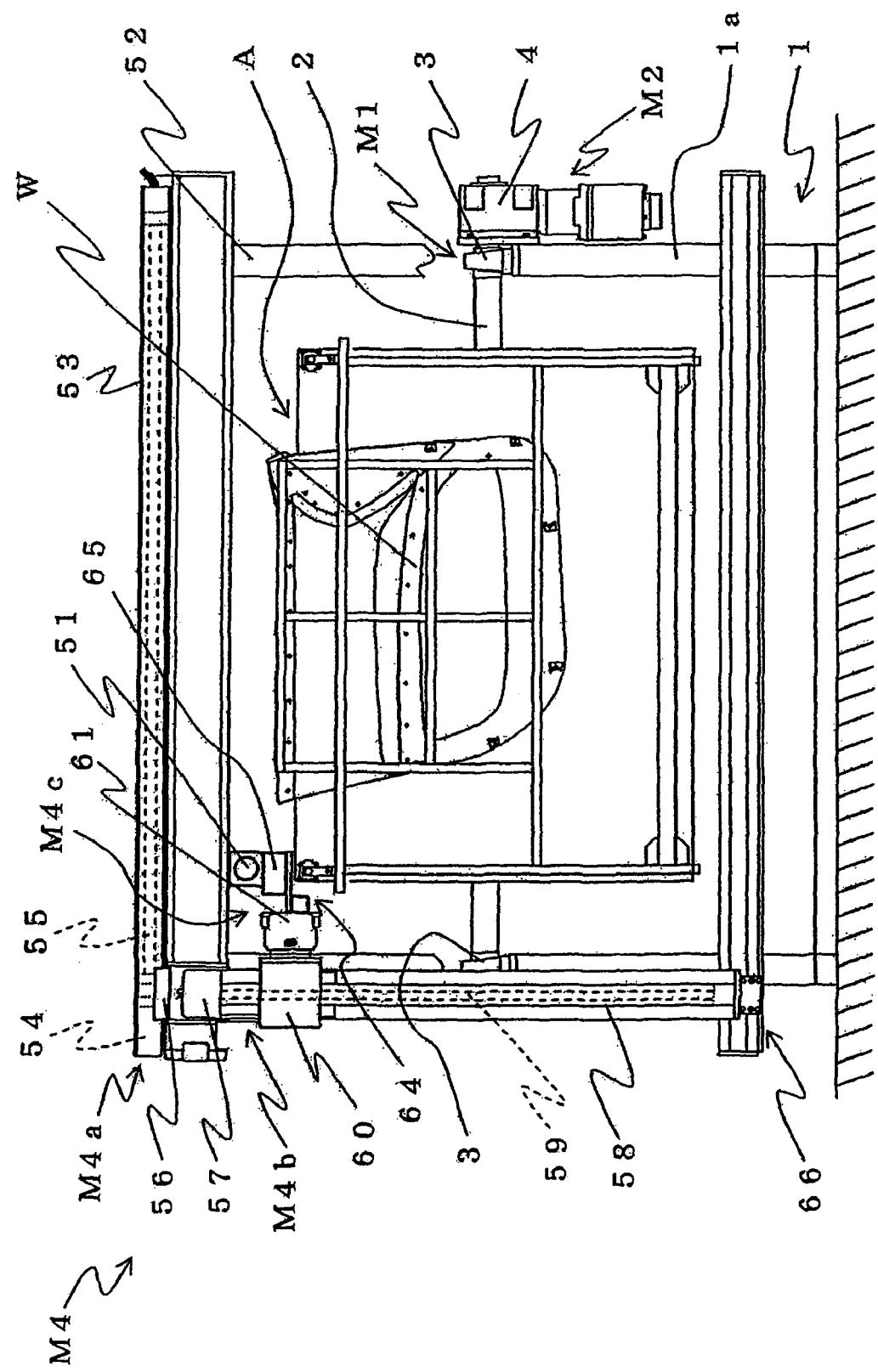
FIG. 3 is a back view of the working machine of FIG. 1.

The receiving jig device and the working machine using the device, of the present invention, is now explained based on the attached drawings. As shown in FIGS. 1-3, the working machine in one embodiment of the present invention comprises: (1) the receiving jig device comprising the base table 1 which is a frame structure, the bearing member M1, the rotating axis 2, the rotating means M2, the first receiving jig A, the second receiving jig B, the engaging means M3, and the control means (not shown) and (2) a welder for a door trim comprising the driving mechanism M4, which comprises a welding means 51 as a working means. FIG. 1 is a cross-sectional view of FIG. 2 on the line I-I, where the first receiving jig A is on the working side, i.e., where the working is carried out by a welder, and the second receiving jig B is on the preparation side, where the object to be processed is loaded and the object that has had the working completed is taken out. In FIG. 2, to show the inside of the working machine, the second receiving jig B is shown only by its outline.

The first receiving jig A and the second receiving jig B of the present invention, which are not limited to those used in this embodiment, comprise a base 31, a receiving member 32 that receives the object to be processed W and that is disposed on the base 31, a holding member 33 disposed in a position that is opposite the predetermined edge portion (not shown) of the object to be processed W that is to be placed in the receiving member 32, and an opening and closing bar 34 that opens and closes the holding member 33. The holding member 33 has a frame that has a structure of a lattice, so as to reduce the weight of the holding member 33.

The operator can open and close the holding member 33 by the operation of the opening and closing bar 34 or can use a driving mechanism (not shown) that engages the opening and closing bar 34 and that opens and closes the holding member 33. Also, the operator can open and close the holding member 33 by the operation of an actuator, which is an arm of a robot.

The base 31 of the first receiving jig A is provided with a frame 35a fixed to the base 31 and a pair of support arms 36a that have the base fastened to a rotating axis 2. Also, the base 31 of the second receiving jig B is provided with a frame 35b fixed to the base 31 and a pair of support arms 36b that are rotatably connected to a rotating axis 2 via a bearing 37. So as to maintain the stable movement of the first receiving jig A and the second receiving jig B around the rotating axis, each set of the support arms 36a and 36b has a pair of (two) support arms. But each set of the support arms 36a and 36b can have three support arms, or the number of the support arms 36a and 36b can even be one in each set if the each arm is sufficiently thick (a thick wall).

Above the supports 1a that are installed (upright) on both edges of the base table 1, a pillow unit 3 is fixed as a bearing member M1. To the outer side of one of the pillow units 3 is installed a driving motor 4 as a rotating means M2 that rotates the rotating axis 2. The driving motor 4 is a servomotor that has an encoder that can detect the position of the rotation of the receiving jig. The rotating axis 2 connects the driving motor 4 and the pillow units 3. Also, the width of the second receiving jig B is made greater than that of the first receiving jig A. Fixing stoppers 38, 39, for frame 35b, are disposed at the positions on the support 1a of the base table 1, which positions are on the circumference of the rotating axis 2. The fixing stoppers 38, 39, hold the second receiving jig B in position when the positioning by the engaging means M3 is not in operation.

In the present embodiment a pillow unit 3 is used as the bearing member M1. But the bearing member M1 is not limited to a pillow unit. It can also include an oil retaining bearing. Also, a driving motor 4 is used as a rotating means M2. But the rotating means M2 can also include a cylinder and a rack-and-pinion that operates by the thrust of the cylinder or it can include a combination of a cylinder and a linking mechanism.

The engaging means M3 of the present invention is not limited to any particular type so long as it has a structure such that the support arms 36a of the first receiving jig and the support arms 36b of the second receiving jig can be in either a connected or a disconnected state. In the present embodiment stopper cylinders 41 are disposed on the outer sides of the support arms 36b, which stopper cylinders 41 are directed to the support arms 36a. In the first receiving jig A and the second receiving jig B, three positioning holes 42a, 42b, and 42c, into which a rod 41a of the stopper cylinders 41 can be inserted, are formed on the circumference of the rotating axis 2, so as to have the first receiving jig A and the second receiving jig B take any of the four positions of P1 to P4 of FIG. 4. In the present embodiment the engaging means M3 is formed by the stopper cylinders 41 and the positioning holes 42a, 42b, and 42c. But the engaging means M3 is not limited to this structure. It can also be formed by an electromagnetic clutch, etc.

The control means is not limited to any particular means, provided (1) that it includes at least a circuit that can adjust the rotational position by the driving motor 4 and (2) that it can hold in turn the first receiving jig A and the second receiving jig B in a vertical position against the welding means 51 by the coordinated driving of the driving motor 4 and the stopper cylinders 41 and that it can hold in turn the first receiving jig A and the second receiving jig B in an inclined position on the side where the object to be processed W is set. Also, in the present invention the rotational position can be adjusted by the sensors that each detect the rotational positions of the first receiving jig A and the second receiving jig B, in place of the driving motors 4 that work as circuits that can adjust the rotational positions.

The driving mechanism M4 comprises the frame body 52 that is installed at the edge of the base table 1, an X-axis-driving mechanism M4a that drives the welding means 51 in the X-axis direction, a Y-axis-driving mechanism M4b that drives the welding means 51 in the Y-axis direction, and a Z-axis-driving mechanism M4c that drives the welding means 51 in the Z-axis direction, which mechanisms are disposed at the back of the frame body 52 and are adjacent to the base table 1.

The X-axis-driving mechanism M4a can comprise a motor 54 and a ball screw 55 that are enclosed within a cover 53. The Y-axis-driving mechanism M4b can comprise a motor 57 that is connected to the nut of the ball screw 55 via a connecting plate 56 and a ball screw 59 that is enclosed within a cover 58. Also, the Z-axis-driving mechanism M4c can comprises a motor 61 that is connected to the nut of the ball screw 59 via an L-shaped angle 60, a ball screw 63 that is enclosed within a cover 62, and an air-cylinder 65 that is connected to the nut of the ball screw 63 via a bracket member 64 and that moves up and down (forward and backward) the welding means 51 against the surface of the object to be processed W. The lower part of the ball screw 59 is connected to a rail member 66 that extends in the X-axis direction. The Y-axis driving mechanism M4b and the Z-axis-driving mechanism M4c are so structured that they can move both in the X-axis direction in sliding movements.

Figure 4:
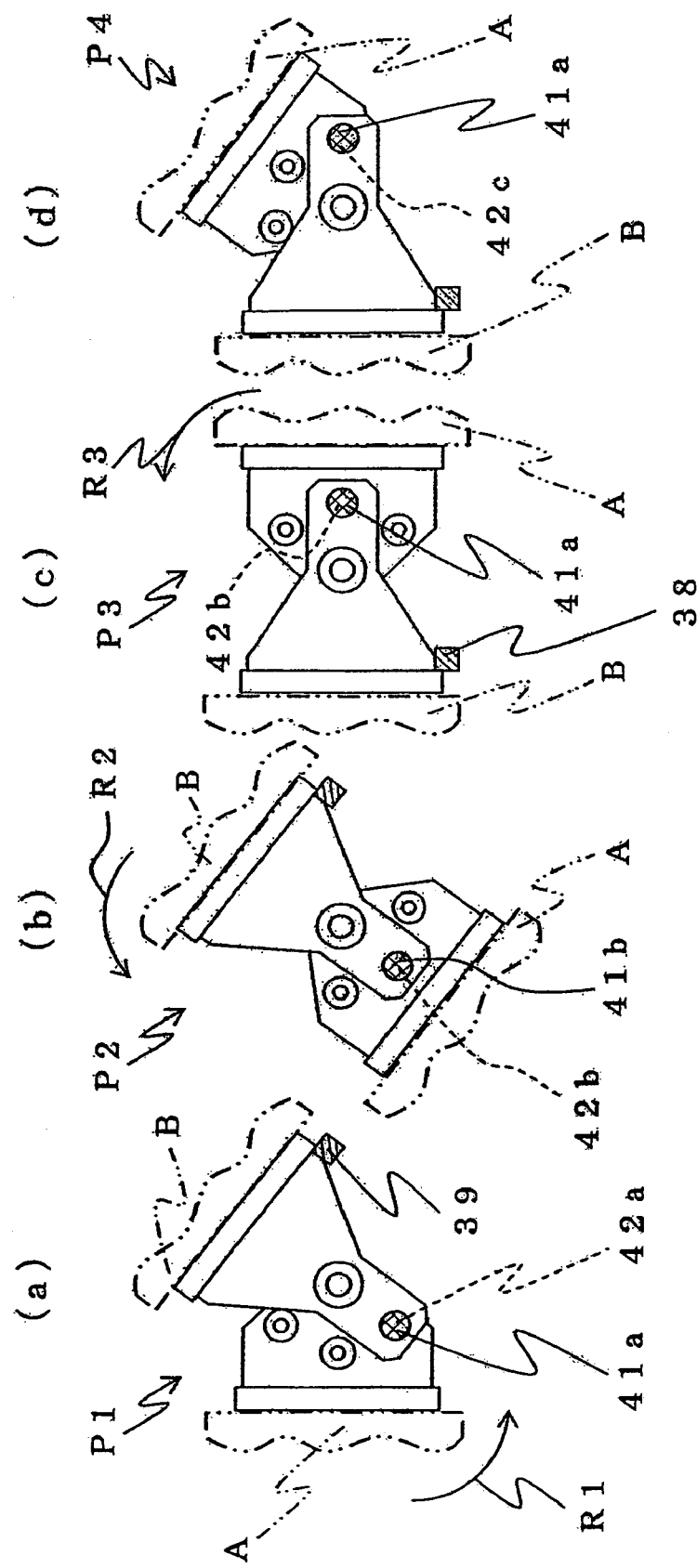
FIG. 4 is a schematic view that shows the changes of the positions of the first receiving jig and the second receiving jig and also shows the timing of the opening and closing of the stopper cylinder.

Next, the movement of the device that has the structure that is disclosed above is explained based on FIGS. 1 and 4. In FIG. 4, only one of the pair of support arms is shown. The position shown in FIG. 4(a) is one that is the same as that shown in FIG. 1, which position is called "P1." From this position P1, the rod 41a is taken out from the positioning hole 42a by the contraction of a stopper cylinder 41 (open-position). At this moment the second receiving jig B does not rotate downward by its own weight, because it is held from rotating b the stopper 39. Next, as shown in FIGS. 4(a) and 4(b), the driving motor 4 rotates in the counter clockwise direction R1. By this movement the first receiving jig A rotates and then stops in the position P2. Then the rod 41a is inserted into the positioning hole 42b by the stopper cylinder 41 being extended (closed position). Next as shown in FIGS. 4(b) and 4(c), the driving motor 4 rotates in the counter clockwise direction R2. By this movement, the first receiving jig A and the second receiving jig B rotate and then the second receiving jig B stops in the position P3 when it contacts the stopper 38.

Next, as shown in FIGS. 4(c) and (d), the driving motor 4 rotates in the counter clockwise direction R3 after the rod 41a is taken out of the positioning hole 42b by the contraction of the stopper cylinder 41 (open position). By this movement, the first receiving jig A is inclined and stops in the position P4. Then the stopper cylinder is extended whereby the rod 41a is inserted into the positioning hole 42c (closed position). The object to be processed that is set on the second receiving jig B that is held in the vertical position P4 is welded, while the object, the working of which has been completed, is taken out of the first receiving jig A and a new object to be processed is loaded onto the first receiving jig A (setting and resetting the material).

After the working of the object is completed, the operation in the counter clockwise direction is carried out, i.e., from the position P4 to the position P1. Namely, the rod 41a of the stopper cylinder 41 is taken out of the positioning hole 42c and the first receiving jig A is moved from the position P4 to the position P3 and held in that position. Next, the rod 41a of the stopper cylinder 41 is inserted into the positioning hole 42b. Then by the driving motor 4 being rotated in the clockwise direction the first receiving jig A and the second receiving jig B are moved from the position P3 to the position P2 and held in that position. Next, the rod 41a of the stopper cylinder 41 is taken out of the positioning hole 42b and by the driving motor 4 being rotated in the positive direction the first receiving jig A is moved to the position P1 and held in the position P1. Then the rod 41a of the stopper cylinder 41 is inserted into the positioning hole 42b. Then the welding work is carried out on the object to be processed that is loaded on the first receiving jig A, while setting and resetting the material on the second receiving jig B, which is on the preparation side, is carried out. The welding work is carried out first by the welding means 51, which is moved above the point to be welded by means of the X-axis driving mechanism M4a, Y-axis driving mechanism M4b, and Z-axis driving mechanism M4c, of the one-axis driving mechanism, and then by an air-cylinder being lowered.

In the present embodiment, the object to be processed that is loaded on the first receiving jig A is welded in an upright position while the material is set and reset on the second receiving jig B, which is in an inclined position. After the welding work is completed, by the counter clockwise rotation of the axis the second receiving jig device B is moved to the working side where the object is processed, and the first receiving jig A is moved to the preparation side, where the material is set. Thus the welding of the object loaded on the first receiving jig A and the object loaded on the second jig B is repeated.

To move the first receiving jig A to the working side and the second receiving jig B to the preparation side can be carried out in a rotational movement around one rotating axis by one driving motor and one stopper cylinder. So, the structure of the machine can be simplified and the area required for installing the machine can be minimized. Also, because the second receiving jig B on the preparation side is in an inclined position, the efficiency to set and reset material can be improved. Further, because in welding, the receiving jig can be in an upright position at the time of working the operator can take a comfortable position and also can have a better view of the working points. Thus the teaching of the welding points can easily be carried out.

The basic Japanese Patent Application, No. 2007-193507, filed Jul. 25, 2007, is hereby incorporated in its entirety by reference in the present application.

The present invention will become more fully understood from the detailed description of this specification. However, the detailed description and the specific embodiment illustrate desired embodiments of the present invention and are given only for the purpose of an explanation. Various possible changes and modifications will be apparent to those of ordinary skill in the art on the basis of the detailed description.

The applicant has no intention to dedicate to the public any disclosed embodiments. Among the disclosed changes and modifications, those that may not literally fall within the scope of the present claims constitute, therefore, a part of the present invention in the sense of the doctrine of equivalents.

The articles "a," "an," and "the," and similar referents in the specification and claims, are to be construed to cover both the singular and the plural, unless otherwise indicated herein or clearly contradicted by the context. The use of any and all examples, or exemplary language (e.g., "such as") provided herein, is intended merely to better illuminate the invention and does not limit the scope of the invention unless otherwise noted

The invention claimed is:

1. A receiving jig device that moves a receiving jig that is loaded with an object to be processed toward a working means that performs a predetermined working, the receiving jig device comprising:
   a base table that has a pair of supports that stand upright on the base table and that face each other;
   bearing members that are disposed on the pair of supports respectively;
   a rotating axis supported by the bearing members;
   a rotating means that rotates the rotating axis;
   a first receiving jig that has supporting arms fixed to the rotation axis;
   a second receiving jig that has supporting arms rotatably connected to the rotating axis;
   an engaging means that causes the supporting arms of the first receiving jig and the supporting arms of the second receiving jig to be in a connected or disconnected state; and
   a control means that controls the positions of the first receiving jig and the second receiving jig,
   wherein the control means holds in turn the first receiving jig and the second receiving jig in an upright position against the working means that is disposed close to the base table where an object is worked, by driving the rotating means and the engaging means in coordinated movement, and also wherein the control means holds in turn the first receiving jig and the second receiving jig in an inclined position on a side where an object to be worked is set for working.

2. The receiving jig device of claim 1, further comprising a working machine having a frame body provided at an edge of the base table of the receiving jig device; and X-axis, Y-axis, and Z-axis driving mechanisms installed on the frame body, which mechanisms move the working means in X-axis, Y-axis, and Z-axis directions, respectively.

* * * * *